H. B. Ramsey.
Harvester Rake.
Nº 25761      Patented Oct. 11, 1859
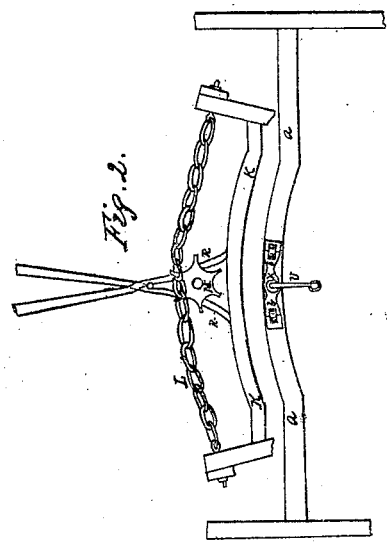
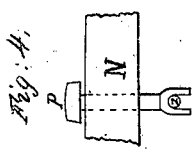
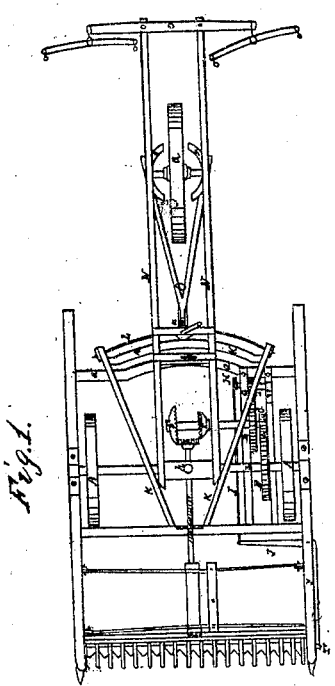
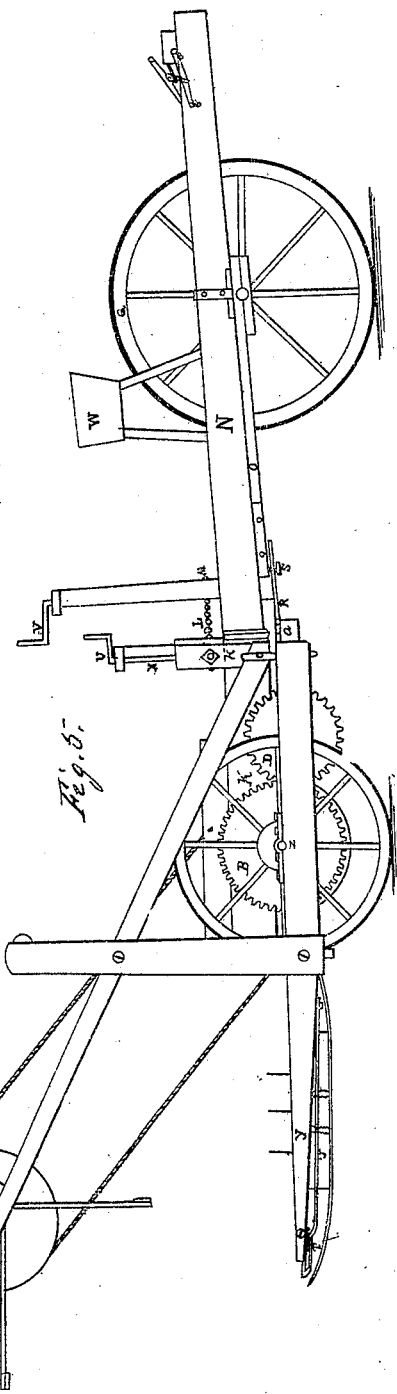
Witnesses
Inventor
Henry B. Ramsey

UNITED STATES PATENT OFFICE.

HENRY B. RAMSEY, OF INDIANAPOLIS, INDIANA.

IMPROVEMENT IN HARVESTERS.

Specification forming part of Letters Patent No. 25,761, dated October 11, 1859.

*To all whom it may concern:*

Be it known that I, HENRY B. RAMSEY, of Indianapolis, in the county of Marion and State of Indiana, have invented a new and useful Improvement in Combined Reaper and Mower, of which the following is a full and exact description, reference being had to the accompanying drawings and the letters marked thereon.

Figures 1, 2, 3, and 4 are sectional views, and Fig. 6 a plain perspective or side view, showing the general construction and arrangement of the machine.

A A are wheels which carry the weight of the machine.

B is a wheel which gears with the pinion C, which is upon the same shaft with and gives motion to the sickle-bar T by means of the pitman I and elbow-lever J. The frame K K K K is attached by journal-boxes to the main or front axle of the machine. The chain L is attached to the frame K K K K and operated by the chain-wheel M, for the purpose of turning the machine.

N N is the draft-frame to which the horses are hitched for the purpose of operating the machine. It is attached to the main axle of the same by the bolt $p$, which rests upon the axle Z, which is designed to revolve in the lower part of the same.

The frame O is supplied with segment-bearings P P, which support the frame N N and allow the wheel Q to turn upon its bearing or tread upon the ground.

The frame K K K K has the projection R R, with a slot, in which the bolt S operates for the purpose of forming a variable joint. The crank V operates the chain-wheel M.

The crank U is designed to operate the screw-rod X for the purpose of adjusting the grain-table Y, which is suspended by journal-boxes upon the main axle Z.

The sickle guard or fingers are attached to the main frame by journals at each end of the bar $i$, to which they are attached, and which is held in the desired position by the bolts or pins $k$ $k$, which pass through the bar or cross-piece $h$.

The following is the operation of the machine. As the same is moved forward, revolving the wheel B, which gears with the pinion C, which is upon the same shaft with and gives motion to the wheel D, which gears with the pinion $g$, which operates the crank H, motion is thereby given to the sickle-bar T by means of the pitman I and elbow-lever J. The machine is guided by operating the chain-wheel M, which carries the back part of the frame K K K K and the front part of the frame O to the side required, while the joint or bolt S being nearly of equal distance from the ground bearing or tread of the wheels A A and Q, the machine is carried around in a true curve, which prevents the machine from sweeping sidewise over the grain. The grain-table is elevated or lowered by operating the friction-bearer $b$ $b$ by means of the crank U and screw-rod X.

By sufficiently lowering the sickle-bar and taking out the apron of the grain-table the machine is converted into a mower, the grass being allowed to fall upon the ground back of the sickle. The fingers or sickle-guards are adjusted by turning the bar $i$ upon its journals and securing the same in position by the bolt or pin $k$. The guard-frame K K K K holds the end of the draft-frame from sliding sidewise while the front of the machine is turning upon the bolt $p$.

What I claim, and desire to secure by Letters Patent, is—

The combination of the frames N, O, and K, chain L, chain-wheel M, crank V, screw-rod X, friction-bearers $b$ $b$, and grain-table Y, when these several parts are constructed and arranged for operation in the manner and for the purposes set forth.

HENRY B. RAMSEY.

Witnesses:
NATHAN EARLYWIN,
BENJAMIN F. DAVIS.